(No Model.)
S. H. PURDY, Dec'd.
S. J. PURDY, Administratrix.
GRAIN SEEDER.
No. 471,192. Patented Mar. 22, 1892.
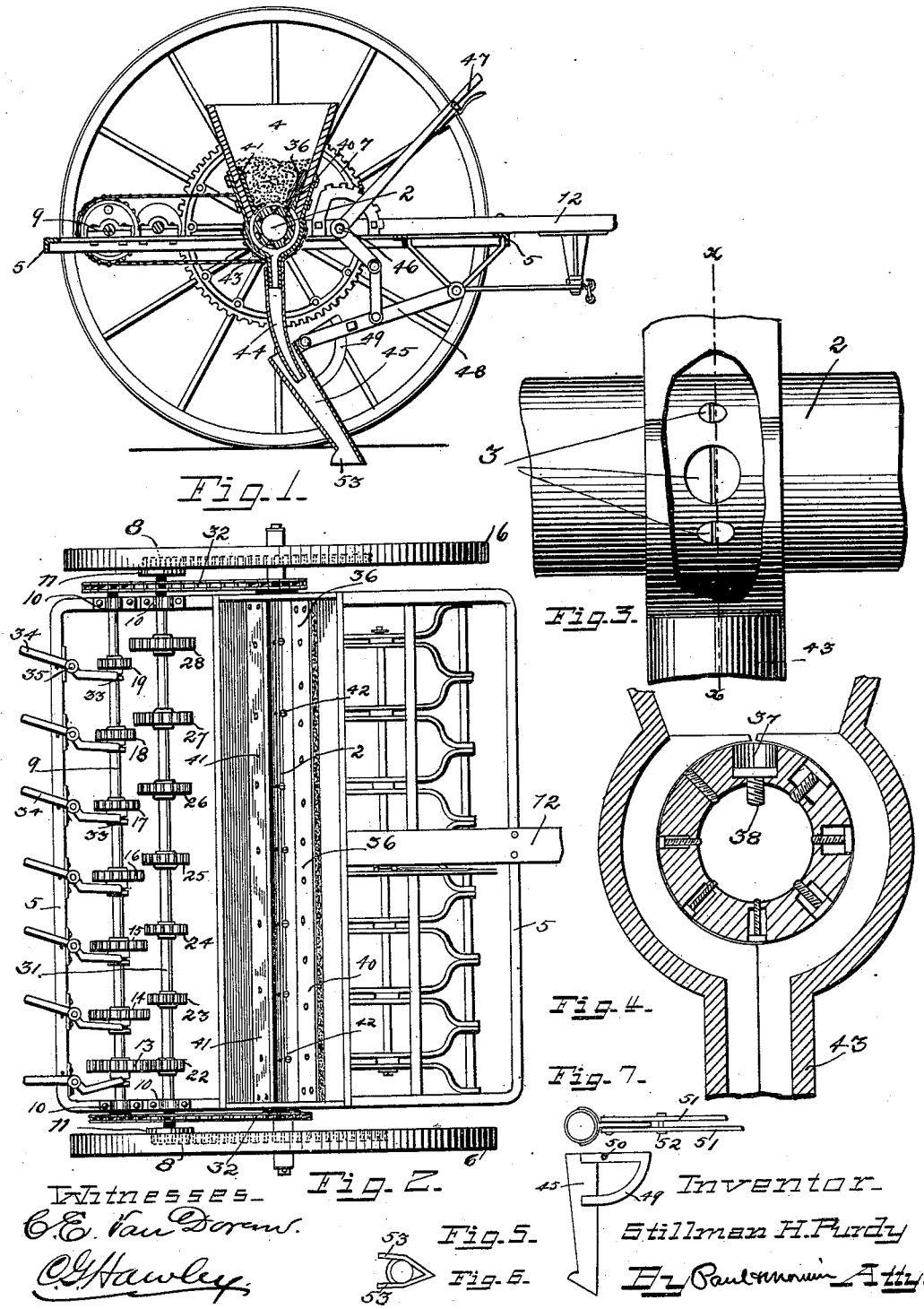

UNITED STATES PATENT OFFICE.

STILLMAN H. PURDY, OF MINNEAPOLIS, MINNESOTA; SARAH J. PURDY ADMINISTRATRIX OF SAID STILLMAN H. PURDY, DECEASED.

GRAIN-SEEDER.

SPECIFICATION forming part of Letters Patent No. 471,192, dated March 22, 1892.

Application filed October 6, 1890. Serial No. 367,182. (No model.)

*To all whom it may concern:*

Be it known that I, STILLMAN H. PURDY, of Minneapolis, in the county of Hennepin and State of Minnesota, have invented certain Improvements in Grain-Seeders, of which the following is a specification.

My invention relates to grain-seeders of the class adapted to evenly distribute small grain or seed.

The object of my invention is to provide means whereby the seeder is adapted for use with all classes of seed ranging in size, for example, from corn down to the smallest seeds, such as mustard, and to deposit the successive grains or parcels of seed at equal distances along the several rows, and, further, to provide means whereby said distances and the distances between the rows may be varied at will.

My invention consists in a roller, in connection with the seed-hopper, adapted to be revolved by the motion of the wheels of the machines, said roller being provided with one or more longitudinal rows of indentations into which the seed from the hopper falls and is carried out of the same under a suitable wiping-brush into the furrow tubes or teeth.

My invention consists, further, in means for increasing or decreasing the rate of revolution of the said roller and in means for closing all of the openings in the feed-roller except those which are in use.

My invention consists, further, in various details of construction hereinafter described, and particularly pointed out in the claims.

In the accompanying drawings, forming a part of this specification, Figure 1 is a sectional side elevation of a seeder embodying my invention. Fig. 2 is a plan view of the same. Fig. 3 shows a small section of the feed-roller provided with several sizes of openings or indentations. Fig. 4 is a section thereof on line *x x* of Fig. 3. Fig. 5 is a side elevation of a novel furrow tube or tooth which I have designed for use in connection with my seeder. Fig. 6 is a plan view of the same from below. Fig. 7 shows the manner of securing the tooth by frictional engagement, whereby the same is made movable if perchance the tooth should strike a stone or root.

As shown in the drawings, my feed-roller 2 is provided with a series of openings or indentations 3 of varying diameters, placed in line around the roller, correspondingly-sized holes being preferably arranged in longitudinal rows. This roller 2, the construction of which will be more fully described hereinafter, is placed in the bottom of the hopper 4 and adapted to rotate in suitable bearings provided in the ends thereof or upon the frame 5 of the machine.

The wheels 6 of the machine are journaled on suitable short axles or studs extending from the frame 5 of the machine and are provided with the cog-wheels 7, meshing with the cog-wheels 8, provided in connection with the shaft 31, rotating in bearings 10 on the frame 5. Suitable ratchet-clutches 11 make the connection between the shaft 9 and the gears 8, whereby the shaft 31 is adapted to rotate only when the machine is drawn ahead by the team hitched to the pole or tongue 12. A number of different-sized gear-wheels 13, 14, 15, 16, 17, 18, and 19 are keyed on the shaft 9 by longitudinal splines and are adapted to be thrown into engagement with gear-wheels 22 to 28, fixed upon the shaft 31. Suitable sprocket-wheels are provided on the opposite ends of the shaft 9, adapted to engage the sprocket-chains 32, running over larger sprocket-wheels provided on the corresponding ends of the feed-roller 2. Each of the gear-wheels 13 to 19 is provided with a grooved collar or hub 33, engaging a suitable lug or pin on the forward end of each shifting bar 34, pivoted at points 35 on the frame 5. Two holes are provided in the frame beneath each of the shifting bars 34, into which a projection (not shown) on the lower surface of each bar extends to hold the bar in one of its positions. As shown in the drawings, only one of these holes appears by the side of each bar, the other one being covered by the bar. Any other suitable means might be employed to hold the levers in position after once set. As shown, the wheels 13 and 22 only are in engagement, and it will be seen that the speed of the roller will be very slow indeed when these two wheels are used. Consequently the distances between the hills of seed will be far greater than if the wheels 19 and 28 were used, in which latter case the speed of the feed-roller would be comparatively high, and as each revolution thereof carries out a given lot of seed the hills would be placed at frequent intervals along the road, the distance being in actual practice as small as three inches, while in the first case supposed the distance between the hills would be about three feet. Between these extremes range all of the other distances as proportioned by the use of the various sets of wheels occupying positions on the shafts between those named.

The roller 2 may be provided with but one set of holes or indentations, in which case practically only one or two different kinds of seeds would be sown by the machine on account of the varying sizes of the seeds—as, for instance, a size suited for use in planting corn, peas, or beans would be much too large for many of the smaller seeds—as, for instance, turnip or mustard or grass seed. For this reason I provide several longitudinal rows of holes varying in diameter and also in depth, so that a set of holes is practically provided for every size of seed which it may be desired to plant. Now it will readily be seen that all of these openings cannot practically be left open at all times, for if this were the case a large amount of seed would be continually carried into the furrow tubes or teeth, when it is only desirous to carry portions of seed or single seeds periodically into the same. For this reason I provide in each of the openings a screw having a slotted head adapted to exactly fill the opening. When a row of openings is not in use, all of the screws therein are screwed out, so as to bring the heads thereof flush with the surface of the roller. The slots in the screw-head are left in transverse position, so that all of the seed will be wiped out of the slots by the brush 36. The rows of holes which it is desired to use are made of the desired depth by merely screwing down the screw so as to lower the head into the bottom of the opening, as is shown in Fig. 4, where the opening 37 is made by turning down the screw 38. Thus the size of each hole in the roller may be independently gaged. For example, the sets of holes may be placed along the roller shown at distances of nine inches from center. If each hole in a longitudinal roll was used, the seed would be planted in rows just nine inches apart. It is obvious that this would be much too close to plant corn, and consequently when the seeder is used for that purpose the alternate holes, or every third hole, would only be used in the largest longitudinal roll. In other words, all of the other screw-heads upon the face of the roll would be brought flush with the surface thereof, only those in the designated positions being screwed down. It is thus seen that practically an almost endless variety of seeds may be successfully planted at distances varying both longitudinally and transversely upon the ground.

It is necessary that the seed should be brushed back from the roller along the bottom of the hopper as the filled openings or holes pass out under the lower edge thereof; otherwise a thin stream of material or seed would be continuously carried out over the rolls. For this purpose I provide the long wiping-brush 36, made up, preferably, of fine steel wire. The ends of the length of the wire abutting against the roll are held in position by the strap 40, extending clear across the hopper, as shown, and secured through the brush to the side of the hopper or the front of the hopper by suitable screws.

I preferably provide a plate 41 along the opposite wall of the hopper to prevent the seed from sifting back over the roller under the rear wall of the hopper. Beneath each series 42 of holes in the roll are the pockets 43, connecting with the flexible holes 44, passing into the furrow-teeth 45. These pockets, though shown straight, are preferably cast with the spout to one side and are placed in alternately-reversed positions, so that alternate teeth are set forward and back to increase the transverse distance between the teeth without increasing the width of the machine. This, however, is a feature common to all seeders.

As shown in Fig. 1 of the drawings, the teeth are set down into the ground. These teeth are all pivotally connected with a shaft 46, upon which the raising-lever 47 is keyed, as shown. By the movement of this lever the teeth may be raised or lowered at will. As the machine is drawn across the field the teeth often strike against solid stones or roots, thereby tending to either stop the team or break or bend a tooth. In order to avoid any such accident or damage I provide a novel connection between the raising-levers and the drawing-levers 48, whereby when a certain power or force is exerted against the front of the tooth the same will be bent back, and this without the breakage of any of the parts. This I accomplish by the employment of the quadrant 49, provided on the front of each tooth and practically forming a part thereof. The tooth is pivoted to the various parts of the lifting and drawing apparatus at the point 50. Each of the draw-bars 48 is made in two pieces 51, adapted to straddle the quadrant 49, the rear end of the bar being pivoted to the tooth at 50. After the quadrant has been thrown up between these side pieces 51 the bolt or thumb-screw 52 is screwed up tight, thereby pinching the sides 51 against the quadrant and holding the tooth firmly in position against all ordinary force which may be exerted against the same. In this way I provide only a frictional engagement between the parts, which may be overcome by an extraordinary jar or shock exerted against the lower end of the tooth as it plows through the ground.

Another important and novel feature of my seeder is the form of the shoe on the lower end of the tooth. Instead of tapering the lower end of the tooth and bending the same forward I split the lower end thereof and bend out the leaves or ears 53, as shown, to form a part of the shoe. The forward part of the shoe is made in substantially the old manner. It will now be readily seen that when the teeth are dropped on the ground for the first time, although the ends of the teeth may be then clogged up with dirt, they will be immediately cleared out by drawing the machine forward, for the dirt will pass out of the opening thus left in the back of each tooth. At the same time more time is given in which the seed may fall into the furrow before the sides thereof fall back over the same. As shown, the lever 47 is provided with a ratchet-and-pawl device whereby the teeth may be raised or lowered and held in a fixed position. If, as in the case before described, it is only desired to use alternate holes in the roller, the teeth beneath the unused openings will be thrown up and hooked in that position, so as to be entirely free from the ground. It is obvious that by placing small partitions transversely in the seed-hopper several kinds of seed might be planted at the same time. It is thus seen that I provide a seeder in the adjustment of which a screw-driver is practically the only tool needed and which may practically be employed for the planting of any stock, for by increasing or decreasing the size of the openings any seed may be accommodated in the roll.

The machine also plants the kernels any desired depth in the ground, either one, two, three, four, or five inches, or any depth that the operator wishes, by adjusting the teeth to the required depth. The front side of each tooth has a sharp edge or diamond shape, which allows it to scour and keep clean.

I claim—

1. The combination, in a seeder, of the feed-roll with bearings therefor, a hopper inclosing the top of said roll, said roll provided with circumferential rows of different-sized holes or indentations, the holes of the same size being arranged in the same longitudinal rows, and means for rotating said roll, substantially as described.

2. The combination, in a seeder, of the hopper with the roller arranged in the bottom thereof and provided with circumferential rows of different-sized holes, the holes of the same size being arranged in distinct rows extending lengthwise of the roll, said roll being geared to rotate with the wheels of the machine, a suitable brush arranged in said hopper and adapted to prevent the escape of seed except as contained in the holes or indentations in the roller, and means for closing all the holes not required for use, substantially as described.

3. The combination, in a seeder, of the roller 2, having the circumferential rows of holes or recesses of different sizes, the holes of the same size being arranged in the same longitudinal row, whereby the holes of a given longitudinal row are all of the same size, but different from those of other rows, the pockets 43, communicating with the furrow-teeth, a screw arranged in each recess and having a head adapted to close the same, and means for rotating said roll, substantially as described.

4. The combination, in a seeder, of the roll 2, provided with the holes or recesses arranged in several longitudinal rows, the holes of each of said rows being of like size, but of a size different from the holes of the other rows, with the hopper 4 and the wiping-brush secured on the inside thereof and adapted to engage said roll.

5. The combination, in a seeder, of the roll having several longitudinal rows of equal-sized holes or recesses, the holes of the different rows being of different sizes, respectively, with the screws arranged in said holes, the hopper 4, the pockets 43, communicating with the furrow-teeth 45 by means of the flexible lengths of hose 44, the frame 5, the wheels 6, the cog-wheels 7, arranged upon said wheels 6 and adapted to rotate therewith, the shafts 9 and 31, provided with the sets of gears, means for throwing all but one of said sets of gears out of engagement, the gear-wheels 8 upon the shaft 9, the ratchet-clutches 11, arranged in connection therewith, and a suitable belt or gear connection between the shaft 31 and the feed-roller 2, substantially as described.

In testimony whereof I have hereunto set my hand this 25th day of September, 1890.

STILLMAN H. PURDY.

In presence of—
BESSIE BOOTH,
A. M. GASKILL.